United States Patent
Nakao

(10) Patent No.: US 8,761,579 B2
(45) Date of Patent: Jun. 24, 2014

(54) VIDEO DATA PROCESSING APPARATUS AND FILE MANAGEMENT METHOD

(75) Inventor: Akihiko Nakao, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/192,308

(22) Filed: Jul. 27, 2011

(65) Prior Publication Data

US 2012/0070126 A1    Mar. 22, 2012

(30) Foreign Application Priority Data

Sep. 16, 2010   (JP) ................................ 2010-207631

(51) Int. Cl.
| | |
|---|---|
| H04N 9/80 | (2006.01) |
| H04N 5/93 | (2006.01) |
| H04N 7/00 | (2011.01) |
| H04N 7/12 | (2006.01) |
| H04J 3/00 | (2006.01) |
| H04J 3/22 | (2006.01) |
| H04L 12/28 | (2006.01) |
| G11B 5/09 | (2006.01) |

(52) U.S. Cl.
USPC ............. 386/248; 386/285; 348/474; 360/32; 370/395.1; 370/470.471; 370/474; 370/476; 375/240.25; 375/240.26; 375/240.28

(58) Field of Classification Search
USPC ........... 386/248, 285, E5.02, E5.072, E9.011; 348/474, E7.001; 340/8.1; 345/629; 360/32; 370/395.1, 470, 471, 474, 476; 375/240.25, 240.26, 240.28

See application file for complete search history.

(56) References Cited

U.S. PATENT DOCUMENTS

| | | | | |
|---|---|---|---|---|
| 7,831,127 B2 * | 11/2010 | Wilkinson | .................... | 370/406 |
| 8,189,690 B2 * | 5/2012 | Whitaker et al. | ........ | 375/240.28 |
| 2004/0218902 A1 * | 11/2004 | Yanagita | ......................... | 386/52 |

FOREIGN PATENT DOCUMENTS

| | | | |
|---|---|---|---|
| JP | 08-214104 A | 8/1996 | |
| JP | 2000-040311 A | 2/2000 | |
| JP | 2008-187371 A | 8/2008 | |
| JP | 2008187371 A * | 8/2008 | ............. H04N 7/173 |
| KR | 2010-0042580 A | 4/2010 | |

OTHER PUBLICATIONS

Background Art Information (Concise Explanation for JP 2008-187371), Toshiba.
Office Action mailed by Korea Patent Office on Jan. 31, 2013 in the corresponding to Japanese patent application No. 10-2011-0992539.

* cited by examiner

Primary Examiner — Daquan Zhao
Assistant Examiner — Syed Hasan
(74) Attorney, Agent, or Firm — Knobbe, Martens Olson & Bear LLP

(57) ABSTRACT

According to one embodiment, a video data processing apparatus which receives a data file includes a file receiving module, an analyzer, a default data storage module, a data restoration module, and a management module. The data file includes a header, in which a header key field, a header length field, and a header value field are arranged. The analyzer detects a character string, thereby detects a header key field of the data file received by the file receiving module, and reads out header metadata information from a following header value field. The data restoration module discards header data from a first position, in absence of the character string at the first position, and restores default data in the default data storage module instead of the discarded header data. The management module stores the header metadata information and the default data.

11 Claims, 9 Drawing Sheets

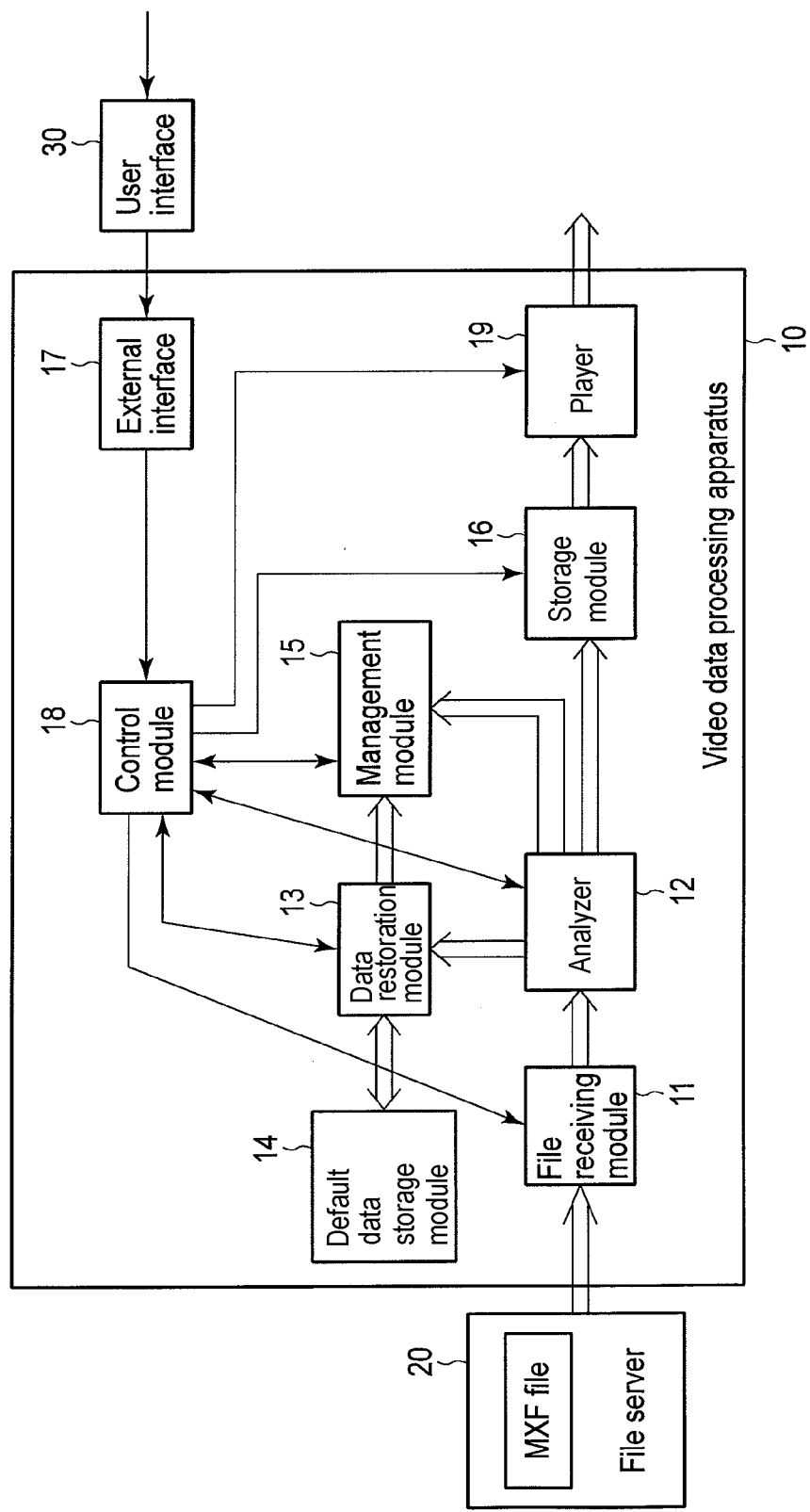
F I G. 1

|  |  | Footer metadata information | | |
|---|---|---|---|---|
|  |  | Normal | Abnormal | Not described |
| Header metadata information | Normal | Footer metadata information | Header metadata information | Header metadata information |
|  | Abnormal | Footer metadata information | Default data | Default data |
|  | Not described | Footer metadata information | Default data | Default data |

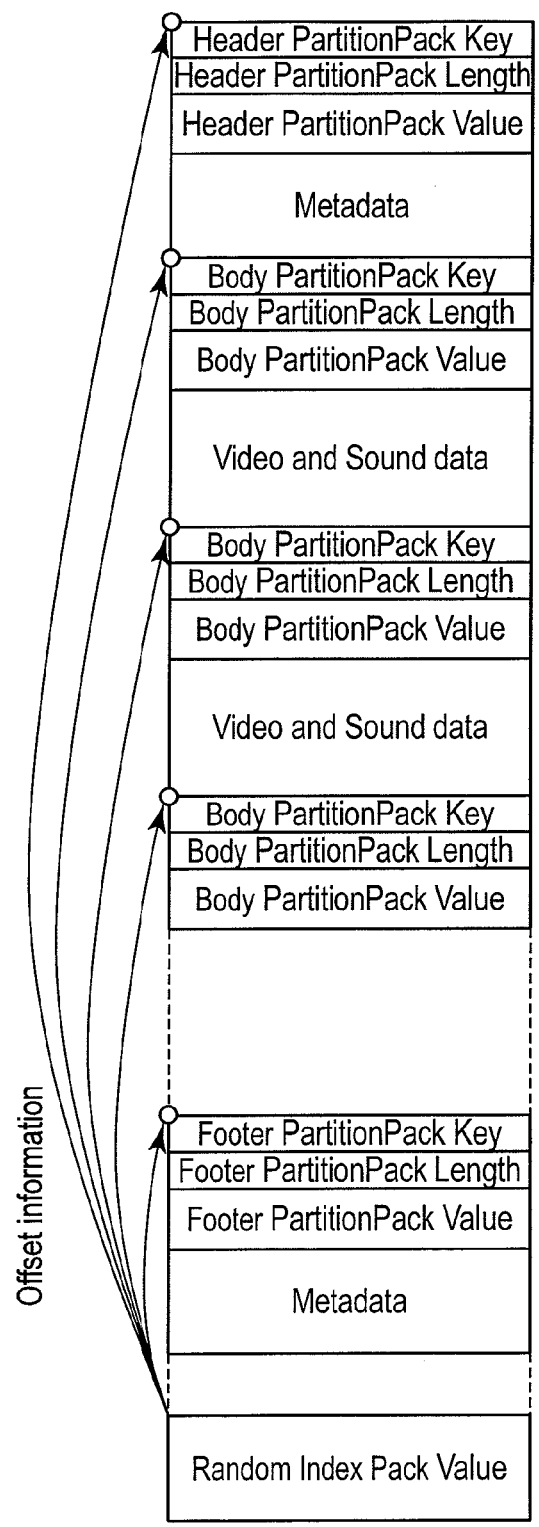
F I G. 12

VIDEO DATA PROCESSING APPARATUS AND FILE MANAGEMENT METHOD

CROSS-REFERENCE TO RELATED APPLICATIONS

This application is based upon and claims the benefit of priority from prior Japanese Patent Application No. 2010-207631, filed Sep. 16, 2010, the entire contents of which are incorporated herein by reference.

FIELD

Embodiments described herein relate generally to a video data processing apparatus and file management method.

BACKGROUND

In recent years, the Material exchange Format (MXF) has been used as a data exchange format for exchanging material data between servers. An MXF file is mainly formed by items such as a header, a body, and a footer. The item "Header" stores various metadata information items. The item "Body" stores frame data including video data and audio data. The metadata information includes information necessary for playing back video and audio stored in the item "Body".

The item "Header" is formed by repeated KLV structures, each of which is formed by the structure including a Key field, a Length field, and a Value field. The Key field indicates the data type of metadata information which is described as Value field. The Length field indicates the data length that the following Value field has. The Value field describes metadata information itself which is designated by the Key field.

When the Key field in the Header is broken, no KLV structure is detected, and thus metadata information might not be read out. In addition, when the Key field is broken, metadata information corresponding to the broken key field might be read as metadata information which corresponds to another key field.

Further, when the Length field in the Header is broken, metadata information which corresponds to a value field followed by the broken length field might not be accurately read out because the length of the Value field cannot be accurately known. In addition, when the Length field is broken, the KLV structure might not be detected because the head position of the next Key field is not detected.

As described above, when a Key field or a Length field is broken, metadata information following the broken part might not be accurately obtained.

BRIEF DESCRIPTION OF THE DRAWINGS

FIG. 1 is a block diagram of a functional structure of a video data processing apparatus according to a first embodiment.

FIG. 12 is a diagram illustrating a structure of the MXF file received by the video data processing apparatus shown in FIG. 7.

DETAILED DESCRIPTION

In general, according to one embodiment, a video data processing apparatus which receives a data file through a network includes a file receiving module, an analyzer, a default data storage module, a data restoration module, and a management module. The data file includes a header, in which a header key field, a header length field, and a header value field are repeatedly arranged in this order. The header key field indicates a data type of header metadata information described in the following header value field. The header length field indicates a data length of the header value field. The header value field describes the header metadata information. The file receiving module connects to the network, and receives the data file through the network. The analyzer detects a character string which indicates a head of the header key field, thereby detects a header key field of the data file received by the file receiving module, and reads out header metadata information from a following header value field, based on a data type indicated by the header key field, and a data length indicated by the header length field following the header key field. The default data storage module stores in advance default data for a substitute header metadata information. The data restoration module discards header data from a position where the character string should be detected, when the character string is not detected at the position, and restores the default data from the default data storage module as header metadata information to be read out from the position to a next header key field. The management module stores the header metadata information read by the analyzer, and the default data restored by the data restoration module.

First Embodiment

An embodiment will be described below with reference to the drawings.

FIG. 1 is a block diagram illustrating a functional structure of a video data processing apparatus 10 according to a first embodiment. The video data processing apparatus 10 illustrated in FIG. 1 is connected to a file server 20, which stores program contents which are converted into MXF files, through an IP network such as Ethernet (Registered Trademark). The file server 20 transmits an MXF file to the video data processing apparatus 10 by, for example, File Transfer Protocol (FTP).

Figure 2:
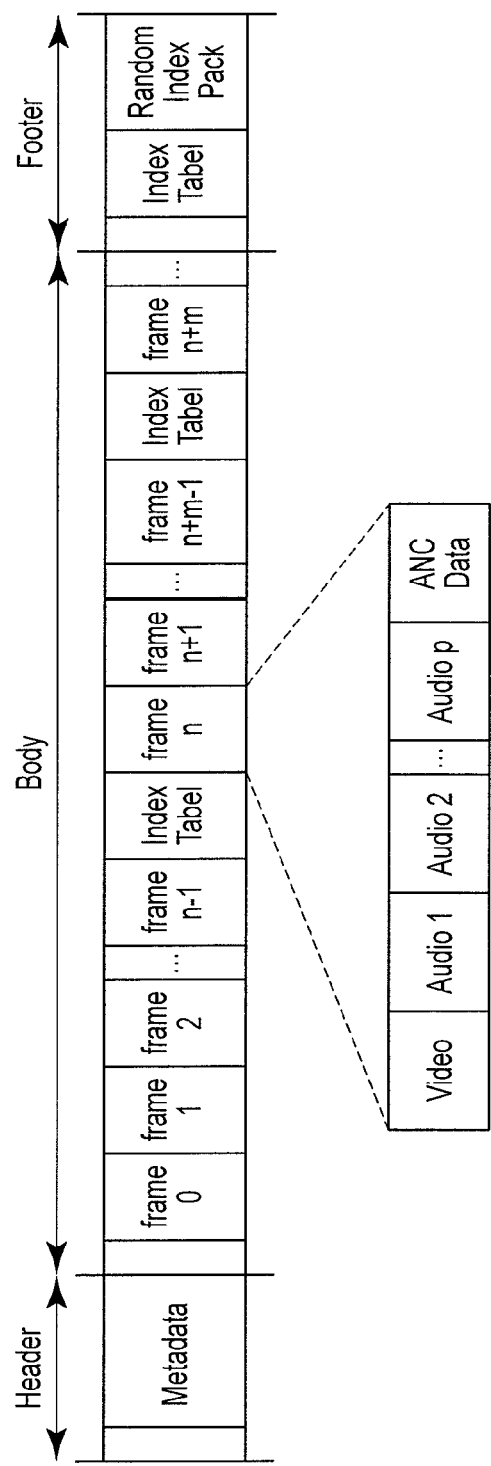
FIG. 2 is an example of a diagram illustrating a logical structure of an MXF file received by the video data processing apparatus shown in FIG. 1.

FIG. 2 is an example of a schematic diagram illustrating a logical structure of an MXF file. As illustrated in FIG. 2, the MXF file is mainly formed of a Header, a Body, and a Footer. The Body stores frame data which includes video data and audio data. The Body follows Header including metadata. The metadata includes metadata information which is necessary for playing back video and audio stored in the Body. The Footer follows the Body.

Figure 3:
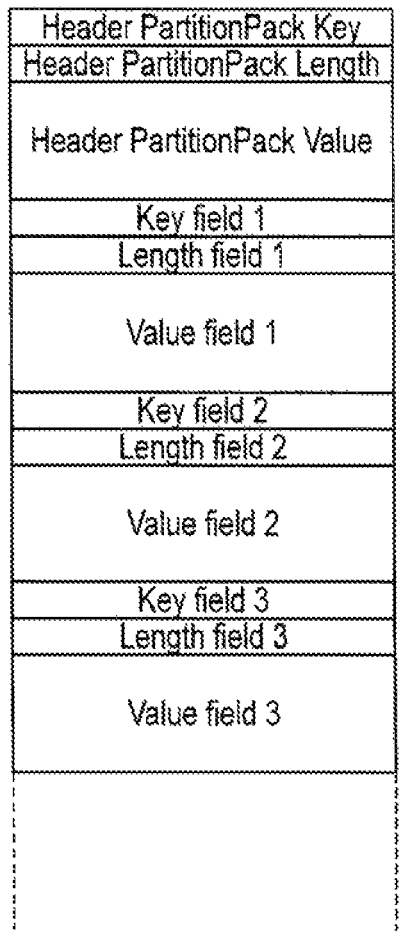
FIG. 3 is a diagram illustrating a structure of a Header of the MXF file illustrated in FIG. 2.

FIG. 3 is a schematic diagram illustrating a structure of the Header. The Header adopts a KLV coding method which is formed by repeatedly disposing a Key field, a Length field, and a Value field. According to FIG. 3, the Header is formed of a Header Partition Pack Key, Header Partition Pack Length, Header Partition Pack Value, Key field 1, Length field 1, Value field 1, Key field 2, Length field 2, and Value field 2 . . . , in this order from the head.

Figure 4:
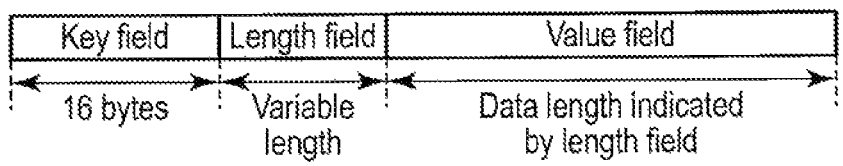
FIG. 4 is a diagram illustrating a specific example of a KLV structure of the Header illustrated in FIG. 3.

FIG. 4 is a diagram illustrating a specific example of the KLV structure in the Header. The total capacity of the Key field is determined as 16 bytes based on the SMPTE standard. The first 4 bytes of the Key field is defined as a character string "06h, 0Eh, 2Bh, 34h". An identifying tag for identifying data is described in the Key field.

The data length of the Length field is variable. Information relating to the data length of the following Value field is described in the Length field.

Metadata information identified by the Key field is described in the Value field. The metadata information has a data length indicated by the Length field.

The video processing apparatus 10 illustrated in FIG. 1 includes a file receiving module 11, an analyzer 12, a data restoration module 13, a default data storage module 14, a management module 15, a storage module 16, an external interface 17, a control module 18, and a playback module 19.

The control module 18 includes a Central Processing Unit (CPU) which is formed of a microprocessor or the like, and controls operations of the file receiving module 11, the analyzer 12, the data restoration module 13, the management module 15, the storage module 16, and the playback module 19.

The file receiving module 11 receives an MXF file transmitted from the file server 20 through an IP network.

The analyzer 12 analyzes the MXF file from the file receiving module 11. Specifically, the analyzer 12 reads out the Header Partition Pack Key, Header Partition Pack Length, and Header Partition Pack value, and then searches for "06h, 0Eh, 2Bh, 34h" which indicates the head of the Key field. When the analyzer 12 detects "06h, 0Eh, 2Bh, 34h", the analyzer 12 reads 16 bytes of data, which is formed of the head part of 4 bytes and data of 12 bytes following the head part, as the Key field. After the Key field is read out, the analyzer 12 reads out the data length described in the Length field. Then, the analyzer 12 reads out metadata information, which is identified by the Key field, has a data length designated by the Length field, and is described in the Value field, following the Length field. As described above, the analyzer 12 detects a KLV structure by detecting the Key field, and obtains metadata information included in each KLV structure. The analyzer 12 outputs the obtained metadata information to the management module 15.

When the analyzer 12 cannot detect "06h, 0Eh, 2Bh, 34h", which indicates a position of the head of the next KLV structure, immediately following the Header Partition Pack Value field or immediately following another Value field, the analyzer 12 generates a redetection signal. The analyzer 12 outputs the redetection signal to the control module 18. When the control module 18 receives the redetection signal, the control module 18 determines that a KLV structure is not detected, and the control module 18 outputs a first control signal to redetect "06h, 0Eh, 2Bh, 34h" to the data restoration module 13. In addition, in receipt of the redetection signal, the control module 18 determines that the previous metadata information obtained is abnormal, and outputs an error signal indicating that the previous metadata information is abnormal to the data restoration module 13. In receipt of the redetection signal, the control module 18 outputs a second control signal to discontinue analysis of the MXF file to the analyzer 12. In receipt of the second control signal from the control module 18, the analyzer 12 discontinues analysis of the MXF file.

When the analyzer 12 receives a third control signal to restart analysis of the MXK file from the control module 18, the analyzer 12 determines if a part including "06h, 0Eh, 2Bh, 34h" redetected by the data restoration module 13 and later fields of the MXF file have a KLV structure or not. When the part including "06h, 0Eh, 2Bh, 34h" and later fields have a KLV structure, the analyzer 12 restarts analysis of the MXF file.

The default data storage module 14 stores in advance default data which is to be substituted for metadata information. The default data includes preset information relating to video resolution, video compression form, data size, and output form of audio data, and the like.

When the data restoration module 13 receives the first control signal from the control module 18, the data restoration module 13 searches for "06h, 0Eh, 2Bh, 34h" by pattern matching, while shifting byte by byte from a position where "06h, 0Eh, 2Bh, 34h" was not detected. When the data restoration module 13 detects the next "06h, 0Eh, 2Bh, 34h", the data restoration module 13 abandons data from the position where "06h, 0Eh, 2Bh, 34h" was not detected to a part before the next "06h, 0Eh, 2Bh, 34h". When the data restoration module detects "06h, 0Eh, 2Bh, 34h", the data restoration module 13 outputs the detection and the detected position to the control module 18. When the control module 18 receives notification from the data restoration module 13, the control module 18 outputs the third control signal to the analyzer 12.

When a value of any metadata information is not determined when analysis of metadata information included in the header is finished, the data restoration module 13 reads default data from the default data storage module 14, and outputs the read default data to the management module 15.

In addition, when the data restoration module 13 receives an error signal from the control module 18, the data restoration module 13 reads default data for the detected previous metadata information from the default data storage module 14, and outputs the read default data to the management module 15.

The management module 15 records normal metadata information output from the analyzer 12, and the default data output from the data restoration module 13.

The storage module 16 records the MXF file which has been analyzed by the analyzer 12.

The external interface 17 connects to a user interface 30, and receives user's instructions input from the user interface 30. The user interface 30 is, for example, a mouse, a keyboard, and a display panel, through which user's instructions are input. When the external interface 17 receives an instruction from the user interface 30, the external interface 17 outputs the instruction to the control module 18.

For example, the user interface 30 receives a playback instruction for playing back the designated MXF file from among MXF files recorded in the storage module 16 in the video data processing apparatus 10. When the control module 18 receives the playback instruction from the external interface 17, the control module 18 reads out metadata information in the MXF file designated by the playback instruction from the management module 15. The control module 18 generates a fourth control signal to read out the designated MXF file based on the read metadata information.

When default data for the designated MXF file is managed by the management module 15, the control module 18 also reads out the default data from the management module 15. The control module 18 generates a fourth control signal to read the designated MXF file based on the read metadata information and the default data. The control module 18 outputs the generated fourth control signal to the playback module 19.

The playback module 19 decodes the MXF file read from the storage module 16, by using the metadata information and the default data, in accordance with the fourth control signal from the control module 18. The playback module 19 outputs a video signal and an audio signal, which are generated by decoding, to the outside.

The following is an explanation of the operation performed when the video data processing apparatus 10 having the above structure obtains metadata information and default data, with reference to an operation process of the control module 18.

Figure 5:
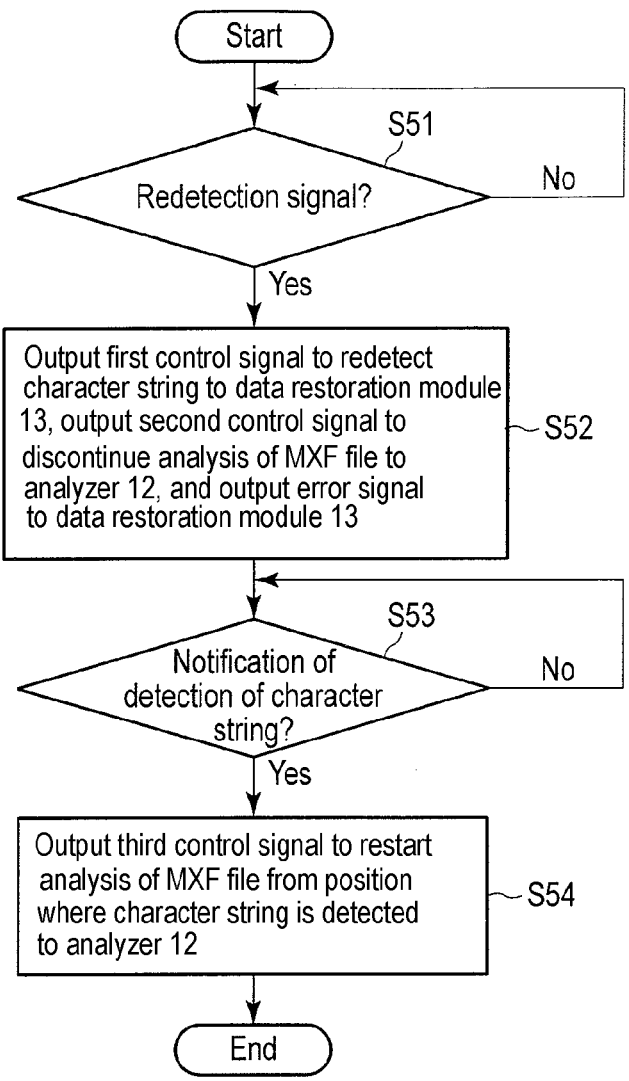
FIG. 5 is a flowchart illustrating processing of a control module shown in FIG. 1, which is performed while recording metadata information and default data in a management module.

FIG. 5 is a flowchart illustrating a processing of the control module 18 according to the first embodiment, which is performed when the analyzer 12 and the data restoration module 13 record metadata information and default data in the management module 15.

Figure 6:
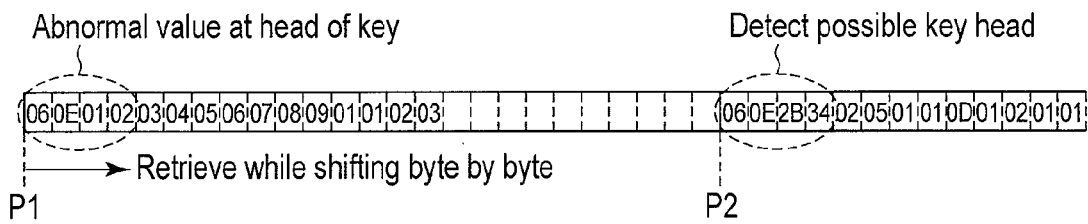
FIG. 6 is a diagram illustrating processing performed when the data restoration module shown in FIG. 1 redetects "06h, 0Eh, 2Bh, 34h".

First, the control module 18 determines if a redetection signal is received from the analyzer 12 (Step S51). When the analyzer 12 cannot detect "06h, 0Eh, 2Bh, 34h" in position P1 which is the head of the Key field as illustrated in FIG. 6, the analyzer 12 outputs a redetection signal to the control module 18. When a redetection signal is received (Yes at Step S51), the control module 18 outputs a first control signal to redetect "06h, 0Eh, 2Bh, 34h" from the position P1 to the data restoration module 13, and outputs a second control signal to discontinue analysis of the MXF file to the analyzer 12. In addition, the control module 18 outputs an error signal indicating that the obtained previous metadata information is abnormal to the data restoration module 13 (Step S52). When the data restoration module 13 receives the error signal, the data restoration module 13 reads out default data for the previous metadata information from the default data storage module 14, and outputs the read default data to the management module 15.

When no redetection data is received (No at Step S51), the control module 18 repeats Step S51 until a redetection signal is received. While Step S51 is repeated, the analyzer 12 reads out metadata information from the MXF file based on the KLV structure, and outputs the read metadata information to the management module 15.

Then, the control module 18 determines if notification is received from the data restoration module 13 that "06h, 0Eh, 2Bh, 34h" is received (Step S53). When the data restoration module 13 receives the first control signal from the control module 18, the data restoration module 13 searches for "06h, 0Eh, 2Bh, 34h", while shifting byte by byte from the position P1. Then, when "06h, 0Eh, 2Bh, 34h" is detected at position P2 as shown in FIG. 6, the data restoration module 13 notifies the control module 18 that "06h, 0Eh, 2Bh, 34h" is detected at the position P2. When the data restoration module 13 detects "06h, 0Eh, 2Bh, 34h", the data restoration module 13 abandons data between the position P1 and the position P2. Then, when analysis of metadata information in the Header is finished, the data restoration module 13 outputs the default data read from the default data storage module 14 to the management module 15, instead of the abandoned metadata information.

When the control module 18 determines that notification is received from the data restoration module 13 (Yes at Step S53), the control module 18 outputs a third control signal to restart analysis of the MXF file from the position P2 to the analyzer 12 (Step S54). When the control module 18 determines that no notification is received from the data restoration module 13 (No at Step S53), the control module 18 repeats the processing of Step S53 until notification is received from the data restoration module 13.

As described above, in the first embodiment, when no "06h, 0Eh, 2Bh, 34h" is detected in a head position of a Key field, "06h, 0Eh, 2Bh, 34h" is redetected from the head position. Thereby, even when an error occurs in a Key field, it is possible to accurately detect the next Key field of the Key field. In addition, even when an error occurs in a Length field and the length of the Value field cannot be accurately known, it is possible to accurately detect the next Key field. Specifically, even when a Key field or a Length field is broken, a KLV structure following the broken part can be accurately detected.

In addition, in the above first embodiment, default data is obtained and recorded in the management module 15, as metadata information which is located between the position where "06h, 0Eh, 2Bh, 34h" cannot be detected and "06h, 0Eh, 2Bh, 34h" which is detected by redetection. Thereby, even if it is an MXF file including the part where no KLV structure is detected, it is possible to obtain metadata information of the part.

Therefore, the video data processing apparatus 10 according to the first embodiment can obtain metadata information of and after the broken part, even when a Key field or a Length field in the Header is broken.

In addition, in the first embodiment, when a playback instruction is input by the user, video data and audio data written in the MXF file are played back with reference to metadata information and default data. Thereby, even if it is an MXF file including the part where a KLV structure is not detected, it is possible to play back video and audio written in the MXF file without disorder.

Further, as the video data processing apparatus 10 according to the first embodiment can be realized by control using an all-purpose FTP protocol, it is unnecessary to design any special hardware as a file server. Specifically, it is possible to realize the video data processing apparatus and the file server at small cost.

Second Embodiment

Figure 7:
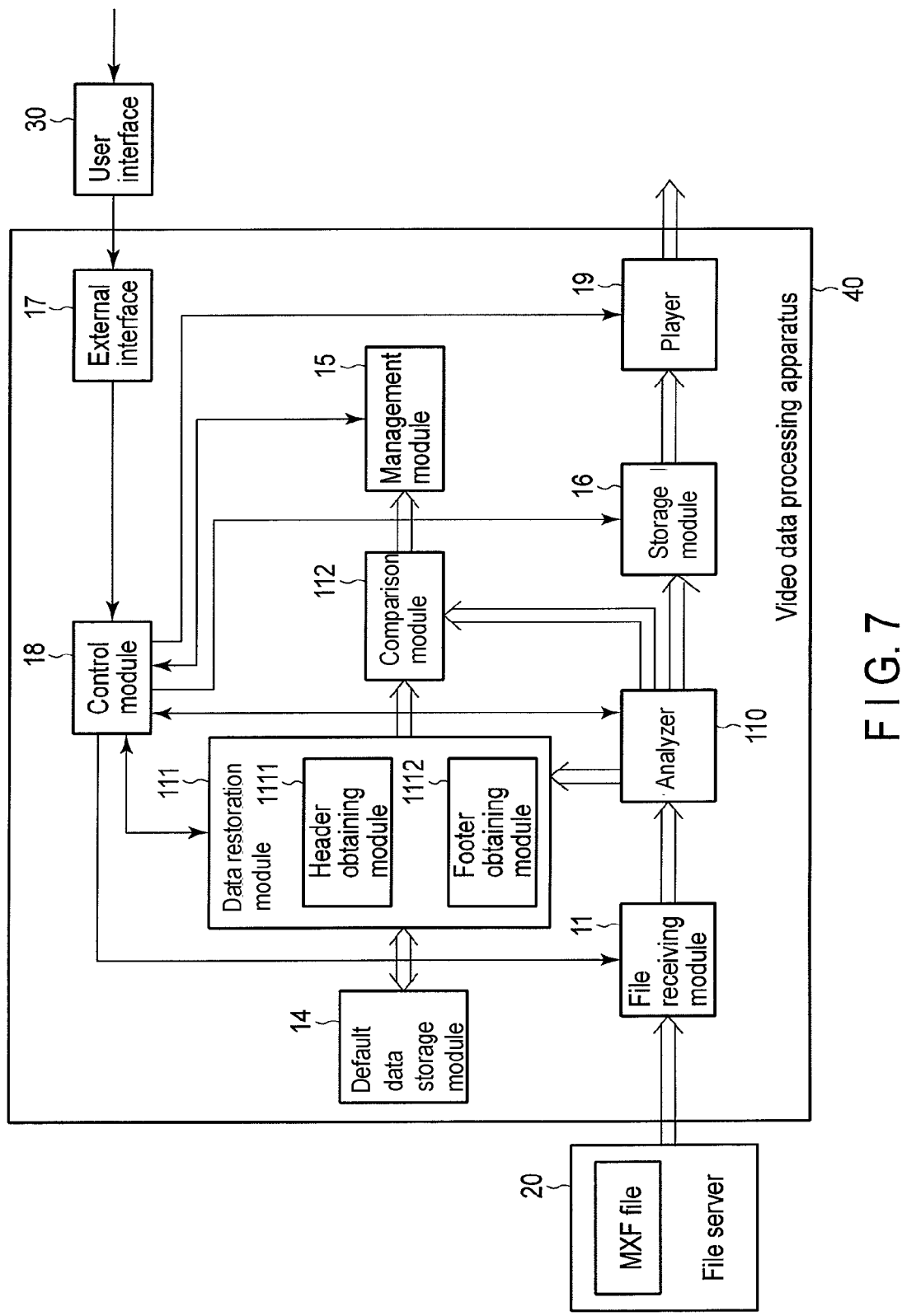
FIG. 7 is a block diagram illustrating a functional structure of a video data processing apparatus according to a second embodiment.

FIG. 7 is a block diagram illustrating a functional structure of a video data processing apparatus 40 according to a second embodiment.

Figure 8:
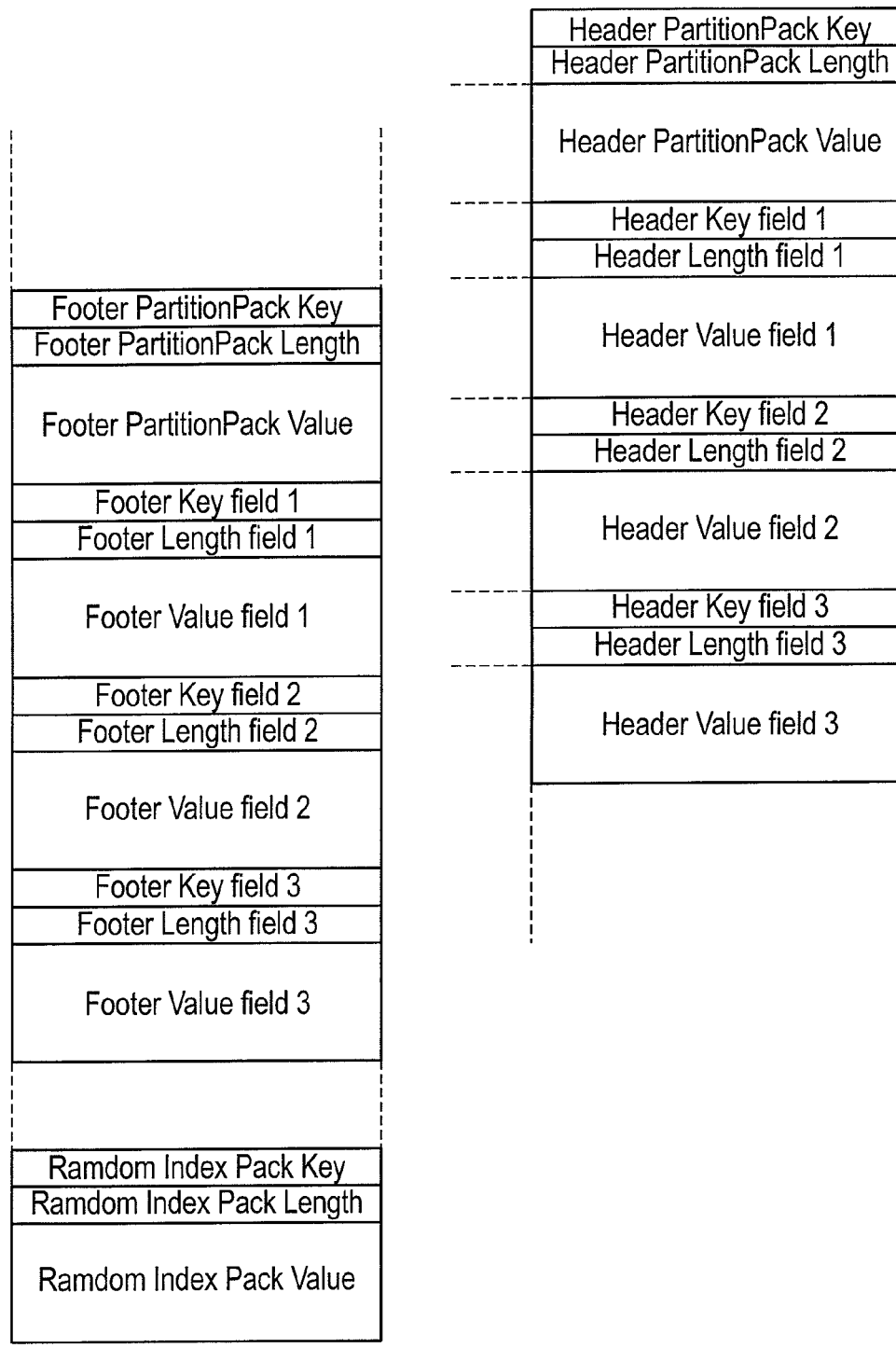
FIG. 8 is a diagram illustrating structures of a Header and a Footer of an MXF file which is received by the video data processing apparatus shown in FIG. 7.

FIG. 8 is a schematic diagram illustrating a structure of a Header and a Footer of an MXF file used in the second embodiment. The KLV coding method is adopted for the MXF file illustrated in FIG. 8, like the MXF file in the first embodiment. Metadata is registered in both the Header and the Footer. In FIG. 8, among header metadata information described in a Header value field and footer metadata information described in a Footer value field, information items which have the same number are the same as a rule. However, in the MXF file of this type, the video recording time, which is part of the Header metadata information, is not determined when preparation of the MXF file is started. Therefore, the Header metadata information is a provisional value, and the Footer metadata information is a fixed value.

The video data processing apparatus 40 illustrated in FIG. 7 includes a file receiving module 11, an analyzer 110, a data restoration module 111, a default data storage module 14, a comparison module 112, a management module 15, a storage module 16, an external interface 17, a control module 18, and a playback module 19.

The analyzer 110 analyzes a Header and a Footer in an MXF file from the file receiving module 11. Specifically, the analyzer 110 reads out a Header Partition Pack Key, a Header Partition Pack Length, and a Header Partition Pack Value, and thereafter searches for "06h, 0Eh, 2Bh, 34h" which indicates the head of the Header Key Field. When "06h, 0Eh, 2Bh, 34h" is detected, the analyzer 110 reads out 16 bytes of data, which is formed of "06h, 0Eh, 2Bh, 34h" of 4 bytes and the following data of 12 bytes, as a Header Key Field. After the Header Key Field is read out, the analyzer 110 reads out a data length described in the Header Length field. Then, the analyzer 110 reads out header metadata information described in the Header Value field, which is identified by the Header Key field and has a data length designated by the Header Length field, following the Header Length field. As described above, the analyzer 110 detects a KLV structure by detecting a Header Key field, and obtains header metadata information included in each KLV structure. The analyzer 110 outputs the read header metadata information to the comparison module 112.

When "06h, 0Eh, 2Bh, 34h" which indicates a head position of the Header Key field cannot be detected immediately following the Header Partition Pack Value or immediately following another Header Value field by analyzing the Header, the analyzer 110 outputs a first redetection signal to the control module 18. When the control module 18 receives the first redetection signal, the control module 18 determines that a KLV structure cannot be detected, and outputs a first control signal to redetect "06h, 0Eh, 2Bh, 34h" to the data restoration module 111. In addition, when the control module 18 receives the first redetection signal, the control module 18 determines that the previous header metadata information obtained is abnormal, and outputs a first error signal indicating that the previous header metadata information is abnormal to the data restoration module 111. Further, when the control module 18 receives the first redetection signal, the control module 18 outputs a second control signal to discontinue analysis of the Header to the analyzer 110. When the analyzer 110 receives the second control signal from the control module 18, the analyzer 110 discontinues analysis of the Header.

In addition, when the analyzer 110 receives a third control signal to restart analysis of the Header from the control module 18, the analyzer 110 determines if the Header following "06h, 0Eh, 2Bh, 34h" redetected by the data restoration module 111 has a KLV structure. If the fields following "06h, 0Eh, 2Bh, 34h" have a KLV structure, the analyzer 110 restarts analysis of the Header.

The analyzer 110 also performs the same analysis as the analysis of the Header, for the Footer, after analysis of the Header. Specifically, the analyzer 110 reads out a Footer Partition Pack Key, a Footer Partition Pack Length, and a Footer Partition Pack Value, and then searches for "06h, 0Eh, 2Bh, 34h" which indicates the head of the Footer Key field. When "06h, 0Eh, 2Bh, 34h" is detected, the analyzer 110 reads 16 bytes of data, which is formed of "06h, 0Eh, 2Bh, 34h" of 4 bytes and the following data of 12 bytes, as a Footer Key field. After the Footer Key field is read out, the analyzer 110 reads a data length described in a Footer Length field. Then, the analyzer 110 reads footer metadata information described in a Footer value field, which is identified by the Footer Key field and has a data length designated by the Footer Length field, following the Footer Length field. As described above, the analyzer 110 detects a KLV structure by detecting the Footer Key field, and obtains footer metadata information included in each KLV structure. The analyzer 110 outputs the read footer metadata information to the comparison module 112.

When "06h, 0Eh, 2Bh, 34h" which indicates a head position of the next Footer Key field cannot be detected immediately following the Footer Partition Pack Value or immediately following another Footer Value field by analysis of the Footer, the analyzer 110 determines that a KLV structure cannot be detected, and outputs a second redetection signal to the control module 18. When the control module 18 receives the second redetection signal, the control module 18 outputs a fourth control signal to redetect "06h, 0Eh, 2Bh, 34h" to the data restoration module 111. In addition, when the control module 18 receives the second redetection signal, the control module 18 determines that the previous footer metadata information obtained is abnormal, and outputs a second error signal indicating that the previous footer metadata information is abnormal to the data restoration module 111. Further, when the control module 18 receives the second redetection signal, the control module 18 outputs a fifth control signal to discontinue analysis of the Footer to the analyzer 110. When the analyzer 110 receives the fifth control signal from the control module 18, the analyzer 110 discontinues analysis of the Footer.

In addition, when the analyzer 110 receives a sixth control signal to restart analysis of the Footer from the control module 18, the analyzer 110 determines if the footer following "06h, 0Eh, 2Bh, 34h" redetected by the data restoration module 111 have a KLV structure. If the field following "06h, 0Eh, 2Bh, 34h" have a KLV structure, the analyzer 110 restarts analysis of the Footer.

The data restoration module 111 includes a header obtaining module 1111, and a footer obtaining module 1112. When the header obtaining module 1111 receives the first control signal from the control module 18, the header obtaining module 1111 searches for "06h, 0Eh, 2Bh, 34h" by pattern matching, while shifting byte by byte from a position where "06h, 0Eh, 2Bh, 34h" cannot be detected. When the next "06h, 0Eh, 2Bh, 34h" is detected, the header obtaining module 1111 abandons data from the position where "06h, 0Eh, 2Bh, 34h" cannot be detected to a part before the next "06h, 0Eh, 2Bh, 34h". When "06h, 0Eh, 2Bh, 34h" is detected, the header obtaining module 1111 outputs detection of "06h, 0Eh, 2Bh, 34h" and the detected position to the control module 18. When the control module 18 receives notification from the header obtaining module 1111, the control module 18 outputs the third control signal to the analyzer 110.

If a value of header metadata information is not fixed at the time when analysis of the header metadata information of the Header is finished, the header obtaining module 1111 reads out default data for the header metadata information having an unfixed value from the default data storage module 14, and outputs the read default data to the comparison module 112.

In addition, when the header obtaining module 1111 receives the first error signal from the control module 18, the header obtaining module 1111 reads out default data corresponding to the detected previous header metadata information from the default data storage module 14, and outputs the read default data to the comparison module 112.

When the footer obtaining module 1112 receives the fourth control signal from the control module 18, the footer obtaining module 1112 searches for "06h, 0Eh, 2Bh, 34h" by pattern matching, while shifting byte by byte from a position where "06h, 0Eh, 2Bh, 34h" cannot be detected. When the next "06h, 0Eh, 2Bh, 34h" is detected, the footer obtaining module 1112 abandons data from the position where "06h, 0Eh, 2Bh, 34h" cannot be detected to a part before the next "06h, 0Eh, 2Bh, 34h". When "06h, 0Eh, 2Bh, 34h" is detected, the footer obtaining module 1112 outputs detection of "06h, 0Eh, 2Bh, 34h" and the detected position to the control module 18. When the control module 18 receives notification from the footer obtaining module 1112, the control module 18 outputs the sixth control signal to the analyzer 110.

If a value of footer metadata information is not fixed at the time when analysis of the footer metadata information of the Footer is finished, the footer obtaining module 1112 reads out default data for the footer metadata information having an unfixed value from the default data storage module 14, and outputs the read default data to the comparison module 112.

In addition, when the footer obtaining module 1112 receives the second error signal from the control module 18, the footer obtaining module 1112 reads out default data corresponding to the detected previous footer metadata information from the default data storage module 14, and outputs the read default data to the comparison module 112.

The comparison module 112 receives the header metadata information and the footer metadata information from the analyzer 110, and the default data from the header obtaining module 1111 and the footer obtaining module 1112. The comparison module 112 compares the header metadata information with the footer metadata information, and outputs data with the relation illustrated in FIG. 9, according to whether these information items are "normal", "abnormal", or "not described".

Figures 9, 10:
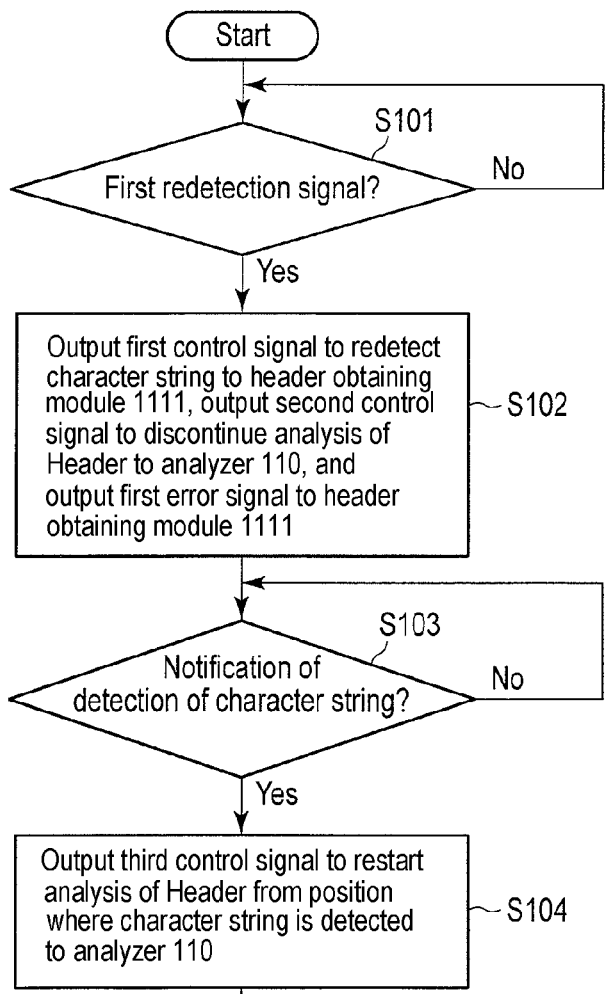
FIG. 9 is an example of a diagram illustrating a relation between header metadata information and footer metadata information in a comparison module shown in FIG. 7.
FIG. 10 is a flowchart illustrating processing of a control module shown in FIG. 7, which is performed while outputting header metadata information and default data to the comparison module.

Since the header metadata information is a provisional value with high possibility, FIG. 9 gives footer metadata information priority over header metadata information, when normal footer metadata information is detected. Specifically, the comparison module 112 compares header metadata information with corresponding footer metadata information, and outputs the footer metadata information to the management module 15 when both are normal. When one metadata information is abnormal or one metadata information is not described among the header metadata information and the footer metadata information, the comparison module 112 outputs the normal metadata information to the management module 15. When both the header metadata information and the footer metadata information are abnormal or are not described, the comparison module 112 outputs the default data to the management module 15.

The management module 15 receives normal metadata information and default data from the comparison module 112, and records them.

When the control module 18 receives a playback instruction from the external interface 17, the control module 18 reads out metadata information of the MXF file designated by the playback instruction from the management module 15. The control module 18 generates a seventh control signal to read out the designated MXF file based on the read metadata information.

When default data for the designated MXF file is managed in the management module 15, the control module 18 also reads out the default data from the management module 15. Then, the control module 18 generates a seventh control signal to read out the MXF file based on the read metadata information and the default data. The control module 18 outputs the generated seventh control signal to the playback module 19.

The playback module 19 decodes the MXF file read out from the storage module 16 by using the metadata information and the default data, in accordance with the seventh control signal from the control module 18. The playback module 19 outputs a video signal and an audio signal prepared by decoding to the outside.

The following is an explanation of the operation performed when the video data processing apparatus 40 having the above structure obtains metadata information and default data, with reference to an operation process of the control module 18.

FIG. 10 is a flowchart illustrating processing of the control module 18, which is performed when the analyzer 110 and the header obtaining module 1111 according to the second embodiment output header metadata information and default data to the comparison module 112.

First, the control module 18 performs analysis of the Header. The control module 18 determines if a first redetection signal is received from the analyzer 110 (Step S101). When the first redetection signal is received (Yes at Step S101), the control module 18 outputs a first control signal to redetect "06h, 0Eh, 2Bh, 34h" from the position P1 of FIG. 6 to the header obtaining module 1111, and outputs a second control signal to discontinue analysis of the Header to the analyzer 110. In addition, the control module 18 outputs a first error signal indicating that the obtained previous header metadata information is abnormal to the header obtaining module 1111 (Step S102). When the header obtaining module 1111 receives the first error signal, the header obtaining module 1111 reads out default data for the obtained previous header metadata information from the default data storage module 14, and outputs the read default data to the comparison module 112.

When no first redetection signal is received (No at Step S101), the control module 18 repeats Step S101 until the control module 18 receives the first redetection signal. While Step S101 is repeated, the analyzer 110 reads out metadata information from the Header based on the KLV structure, and outputs the read metadata information to the comparison module 112.

Then, the control module 18 determines if notification is received from the header obtaining module 1111 that "06h, 0Eh, 2Bh, 34h" is received (Step S103). When the header obtaining module 1111 receives the first control signal from the control module 18, the header obtaining module 1111 searches for "06h, 0Eh, 2Bh, 34h", while shifting byte by byte from the position P1. Then, when "06h, 0Eh, 2Bh, 34h" is detected at position P2 shown in FIG. 6, the header obtaining module 1111 notifies the control module 18 that "06h, 0Eh, 2Bh, 34h" is detected at the position P2. When the header obtaining module 1111 detects "06h, 0Eh, 2Bh, 34h", the header obtaining module 1111 abandons data between the position P1 and the position P2. Then, when analysis of header metadata information in the Header is finished, the header obtaining module 1111 outputs the default data read from the default data storage module 14 to the comparison module 112, instead of the abandoned header metadata information.

When notification is received from the header obtaining module 1111 (Yes at Step S103), the control module 18 outputs a third control signal to restart analysis of the Header from the position P2 to the analyzer 110 (Step S104). When no notification is received from the header obtaining module 1111 (No at Step S103), the control module 18 repeats the processing of Step S103 until notification is received from the header obtaining module 1111.

Figure 11:
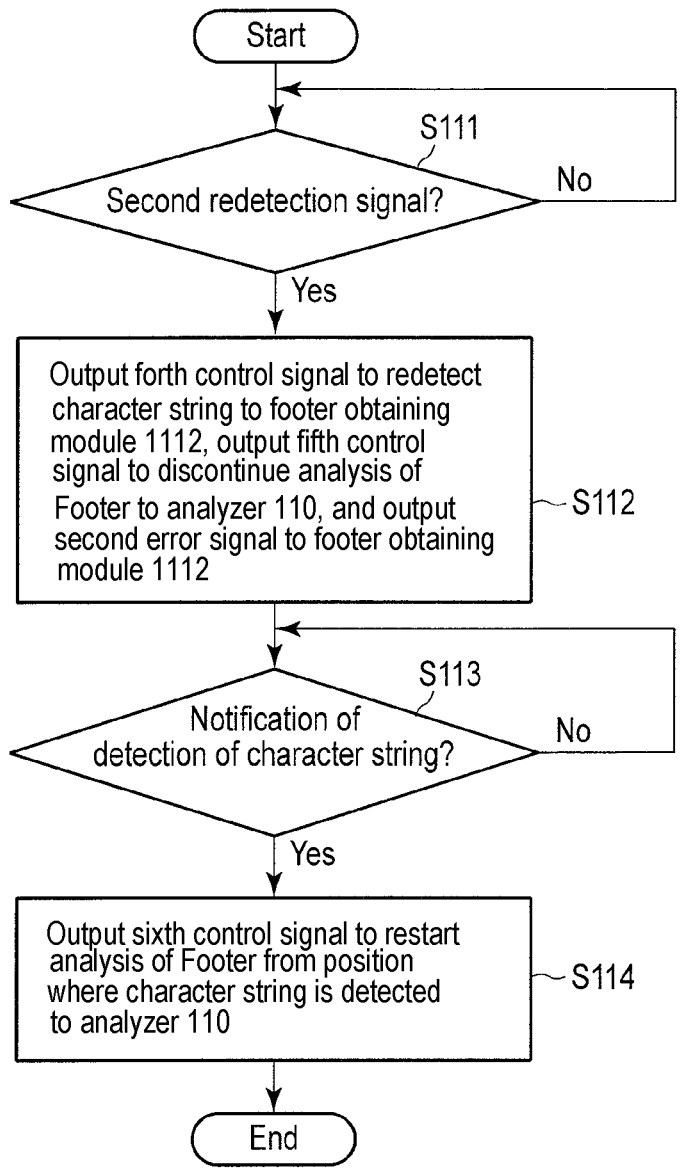
FIG. 11 is a flowchart illustrating processing of the control module shown in FIG. 7, which is performed while outputting footer metadata information and default data to the comparison module.

FIG. 11 is a flowchart illustrating processing of the control module 18, which is performed when the analyzer 110 and the footer obtaining module 1112 according to the second embodiment output footer metadata information and default data to the comparison module 112.

When analysis of the Header is finished, the control module 18 performs analysis of the Footer. The control module 18 determines if a second redetection signal is received from the analyzer 110 (Step S111). When the second redetection signal is received (Yes at Step S111), the control module 18 outputs a fourth control signal to redetect "06h, 0Eh, 2Bh, 34h" from the position P1 of FIG. 6 to the footer obtaining module 1112, and outputs a fifth control signal to discontinue analysis of the Footer to the analyzer 110. In addition, the control module 18 outputs a second error signal indicating that the obtained previous footer metadata information is abnormal to the footer obtaining module 1112 (Step S112). When the footer obtaining module 1112 receives the second error signal, the footer obtaining module 1112 reads out default data for the obtained previous footer metadata information from the default data storage module 14, and outputs the read default data to the comparison module 112.

When no second redetection signal is received (No at Step S111), the control module 18 repeats Step S111 until the control module 18 receives the second redetection signal. While Step S111 is repeated, the analyzer 110 reads out metadata information from the Footer based on the KLV structure, and outputs the read footer metadata information to the comparison module 112.

Then, the control module 18 determines if notification is received from the footer obtaining module 1112 that "06h, 0Eh, 2Bh, 34h" is received (Step S113). When the footer obtaining module 1112 receives the fourth control signal from the control module 18, the footer obtaining module 1112 searches for "06h, 0Eh, 2Bh, 34h", while shifting byte by byte from the position P1. Then, when "06h, 0Eh, 2Bh, 34h" is detected in position P2 shown in FIG. 6, the footer obtaining module 1112 notifies the control module 18 that "06h, 0Eh, 2Bh, 34h" is detected at the position P2. When the footer obtaining module 1112 detects "06h, 0Eh, 2Bh, 34h", the footer obtaining module 1112 abandons data between the position P1 and the position P2. Then, when analysis of footer metadata information in the Footer is finished, the footer obtaining module 1112 outputs the default data read from the default data storage module 14 to the comparison module 112, instead of the abandoned footer metadata information.

When the control module 18 determines that notification is received from the footer obtaining module 1112 (Yes at Step S113), the control module 18 outputs a sixth control signal to restart analysis of the Footer from the position P2 to the analyzer 110 (Step S114). When the control module 18 determines that no notification is received from the footer obtaining module 1112 (No at Step S113), the control module 18 repeats the processing of Step S113 until notification is received from the footer obtaining module 1112.

As described above, in the second embodiment described above, header metadata information is written in the Header, and footer metadata information is written in the Footer. In this case, the analyzer 110 reads out header metadata information from the Header, and reads out footer metadata information from the Footer. Then, when both the header metadata information and the footer metadata information are normal, the comparison module 112 selects the footer metadata information, and records the footer metadata information in the management module 15. Thereby, it is possible to record footer metadata information, which is a value more accurate than the header metadata information, in the management module 15.

In addition, in the second embodiment, when the KLV structure of one of the Header and the Footer is not detected and default data is obtained instead of one of the header metadata information and the footer metadata information, the comparison module 112 selects metadata information which is normally obtained, and records the selected metadata information in the management module 15. Thereby, even when the KLV structure of one of the Header and the Footer is not detected, it is possible to obtain normal metadata information.

Although the second embodiment shows an example in which the Header and the Footer are successively analyzed from the head of the MXF file, the second embodiment is not limited to this structure. For example, it is possible to use a Random Index Pack Value which is located at the end of the MXF file illustrated in FIG. 12.

The following is an explanation of operation performed by the video data processing apparatus 40 according to the second embodiment when metadata information is obtained from the MXF file by using the Random Index Pack Value. As illustrated in FIG. 12, information which is called "Partition Pack" is inserted to the head part of the Header, the head and the middle parts of the Body, and the head part of the Footer. The Partition Pack includes a Partition Pack Key, a Partition Pack Length, and a Partition Pack Value. The Random Index Pack Value stores offset values from the head of the MXF file to the respective head positions of the Partition Pack Keys.

The control module 18 controls the file receiving module 11 to obtain the Random Index Pack Value of the MXF file recorded in the file server 20.

In accordance with control by the control module 18, the file receiving module 11 outputs an output request based on a FTP protocol or the like to output the Random Index Pack Value of the MXF file to the file server 20. In response to the output request, the file server 20 outputs the Random Index Pack Value of the MXF file to the file receiving module 11. The file receiving module 11 receives the Random Index Pack Value from the file server 20, and notifies the control module 18 of the received Random Index Pack Value.

The control module 18 identifies the position of the Footer Partition Pack Key based on the Random Index Pack Value, and controls the file receiving module 11 to obtain the Footer of the MXF file recorded in the file server 20. In accordance with control by the control module 18, the file receiving module 11 outputs an output request to output the Footer of the MXF file to the file server 20. In response to the output request, the file server 20 outputs the Footer of the MXF file to the file receiving module 11. The file receiving module 11 receives the Footer from the file server 20, and outputs the received Footer to the analyzer 110.

The analyzer 110 analyzes the Footer, and obtains footer metadata information by using the KLV structure. The analyzer 110 outputs the obtained footer metadata information to the comparison module 112. When the KLV structure cannot be detected during analysis of the Footer, the footer obtaining module 1112 redetects "06h, 0Eh, 2Bh, 34h", detects the next Footer Key field, and obtains default data.

When analysis of the Footer of the MXF file is finished, the control module 18 controls the file receiving module 11 to obtain the whole MXF file recorded in the file server 20. In accordance with control by the control module 18, the file receiving module 11 outputs an output request to output the whole MXF file to the file server 20. In response to the output request, the file server 20 outputs the MXF file to the file receiving module 11. The file receiving module 11 receives the MXF file from the file server 20, and outputs the received MXF file to the analyzer 110.

The analyzer 110 analyzes the MXF file from the head, and obtains header metadata information by using the KLV structure. The analyzer 110 outputs the obtained header metadata information to the comparison module 112. When the KLV structure cannot be detected during analysis of the Header, the header obtaining module 1111 redetects "06h, 0Eh, 2Bh, 34h", detects the next Header Key field, and obtains default data.

As described above, the video data processing apparatus 40 may analyze the Footer of the MXF file before analyzing the Header, by using the Random Index Pack Value. When the whole MXF file is received from the file server 20 and the received MXF file is successively analyzed from the head, the Footer is received after the Body of the MXF file is received. Therefore, it is required to wait until the transmission time of the Body is passed to start analysis of the Footer. However, analysis of the Footer is started first by using the Random Index Pack Value, and thereby it is possible to start playback processing of video and audio immediately following reception of the whole MXF file is started.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video data processing apparatus configured to receive a data file through a network, the video data processing apparatus comprising:
   a file receiving module connected to the network, and configured to receive the data file comprising a header through the network, the header comprising at least one set of a header key field, a header length field, and a header value field as a KLV structure, the header key field indicative of a data type of header metadata information in the following header value field, the header length field indicative of a data length of the header value field, the header value field comprising the header metadata information;
   an analyzer configured to detect a character string at a head of the header key field in the KLV structure, and to read out header metadata information from the header value field following the header key field in which the character string is detected, based on the data type in the header key field and the data length in the header length field following the header key field;
   a default data storage module configured to store default data;
   a data restoration module configured to discard header data and restore the default data in place of the discarded header data, wherein the discarded header data is from a first position at which the character string is not detected to a second position at which the character string is detected in the KLV structure; and
   a management module configured to store the read header metadata information, and the restored default data.

2. The video data processing apparatus of claim 1, wherein the analyzer is configured to read out the header metadata information from the header value field following the second position based on the data type in the header key field and the data length in the header length field following the second position.

3. The video data processing apparatus of claim 1, further comprising:
   a storage module configured to store the data file, after analysis of the data file by the analyzer; and
   a player configured to play back the data file in the storage module, in accordance with a playback instruction, based on the header metadata information and the default data stored in the management module.

4. The video data processing apparatus of claim 1, wherein the data file further comprises a footer comprising a footer key field, a footer length field, and a footer value field in a second repetition order, the footer key field indicative of a data type of footer metadata information in the following footer value field, the footer length field indicative of a data length of the footer value field, the footer value field comprising the footer metadata information, the footer metadata information corresponds to the header metadata information,
   the analyzer further configured to detect the character string, to detect a footer key field of the received data file, and to read out footer metadata information from a following footer value field, based on a data type in the footer key field, and a data length in the footer length field following the footer key field,
   the data restoration module configured to discard footer data from a second position, in absence of the character string at the second position, and to restore the default data in place of the discarded footer data from the position to a next footer key field, and
   the video data processing apparatus further comprises:
   a comparison module configured to determine whether the header metadata information and the footer metadata information, which correspond to each other, satisfy a first condition, to output the footer metadata information to the management module if the footer metadata information satisfies the first condition, to output the header metadata information to the management module if the header metadata information satisfies the first condition and the footer metadata information does not satisfy the first condition, and to output the default data if neither the header metadata information nor the footer metadata information satisfies the first condition.

5. The video data processing apparatus of claim 4, wherein the comparison module is further configured to output one of the header metadata information or the footer metadata information which satisfies the first condition to the management module if the other of the header metadata information and the footer metadata information is either not satisfying the first condition or not described, and to output the default data to the management module if none of the header metadata information and the footer metadata information satisfies the first condition.

6. The video data processing apparatus of claim 4, wherein the analyzer is configured to read out footer metadata information from a following footer value field, based on a data type in the next footer key field and a data length in a footer length field following the next footer key field.

7. The video data processing apparatus of claim 4, further comprising:
   a storage module configured to store the data file after analysis of the data file by the analyzer; and a player configured to play back the data file in the storage module, in accordance with a playback instruction, based on the header metadata information, the footer metadata information, and the default data stored in the management module.

8. The video data processing apparatus of claim 4, wherein
the data file is an MXF file, the MXF file comprising a header, a body, and a footer, the header and the footer configured to receive a partition pack, and the footer comprises a random index pack value at an end, the random index pack value indicative of offset values from a head of the MXF file to respective head positions of the partition packs, the file receiving module is configured to receive the footer of the MXF file in prior to the header of the MXF file, by referring to the offset values in the random index pack value, and the analyzer is configured to analyze the footer prior to the analysis of the header.

9. A file management method used in a video data processing apparatus, the file management method comprising:
connecting to the network, and
receiving the data file comprising a header through the network, the header comprising at least one set of a header key field, a header length field, and a header value field in a KLV structure, the header key field indicative of a data type of header metadata information in the following header value field, the header length field indicative of a data length of the header value field, the header value field comprising the header metadata information through the network;

detecting a character string at a head of the header key field in the KLV structure;

reading out header metadata information from the header value field following the header key field in which the character string is detected, based on the data type in the header key field and the data length in the header length field following the header key field;

discarding header data and restoring default data in place of the discarded header data, wherein the discarded header data is from a first position at which the character string is not detected to a second position at which the character string is detected in the KLV structure; and storing the read header metadata information and the restored default data in a management module.

10. The file management method of claim 9, further comprising:
reading out the header metadata information from the header value field following the second position based on the data type in the header key field and the data length in the header length field following the second position.

11. The file management method of claim 9, further comprising:
storing the data file in a storage module, after analysis of the data file; and
playing back the data file in the storage module, in accordance with a playback instruction, based on the header metadata information and the default data stored in the management module.

* * * * *